United States Patent [19]

Davies

[11] 4,262,792
[45] Apr. 21, 1981

[54] DISTRIBUTING STREAMS OF ARTICLES

[75] Inventor: Robert W. Davies, London, England

[73] Assignee: Molins Limited, London, England

[21] Appl. No.: 35,021

[22] Filed: Apr. 30, 1979

[51] Int. Cl.³ .............................................. B65G 47/00
[52] U.S. Cl. .................................... 198/348; 198/362; 198/434
[58] Field of Search ............... 198/362, 449, 450, 441, 198/434, 348

[56] References Cited

U.S. PATENT DOCUMENTS

| | | | |
|---|---|---|---|
| 1,997,532 | 4/1935 | Molins | 198/441 |
| 4,067,435 | 1/1978 | Toby | 198/434 |

Primary Examiner—Robert B. Reeves
Assistant Examiner—Douglas D. Watts
Attorney, Agent, or Firm—John C. Smith, Jr.

[57] ABSTRACT

A conveyor system for distributing packets from two packing machines among the two tracks of a wrapping machine includes an indexing conveyor and a rotary pusher for each track. Packets are fed from the packing machines along respective conveyors and delivered by plungers on to the conveyor at every second stoppage period thereof. The rotary pushers operate in phased relationship, so that an equal number of packets reaches each track.

5 Claims, 4 Drawing Figures

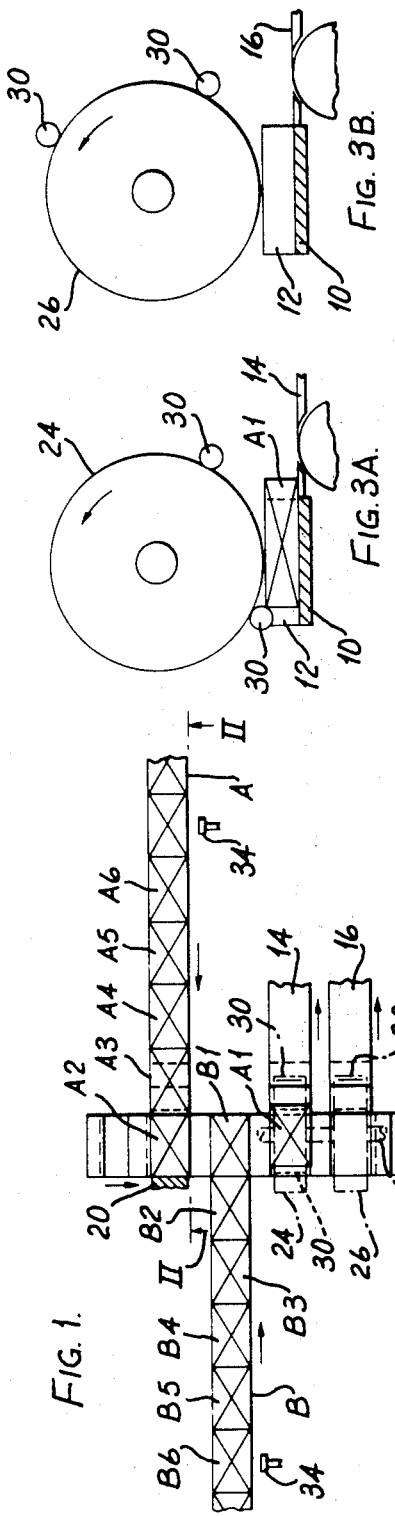
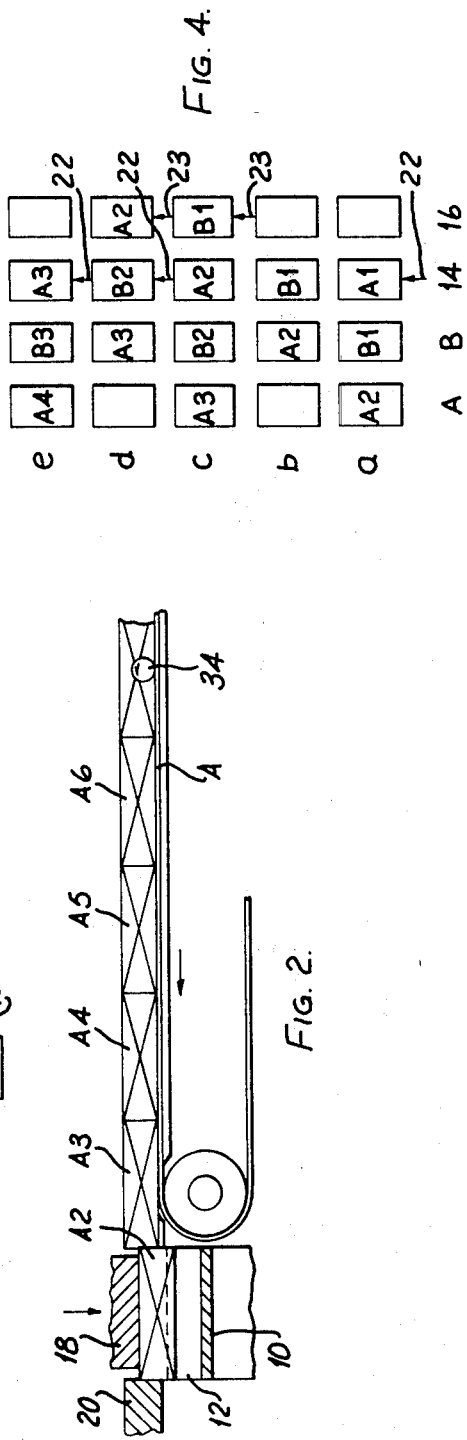

DISTRIBUTING STREAMS OF ARTICLES

This invention is concerned with the distribution of streams of articles (e.g. packets of cigarettes) uniformly among at least two inputs.

Cigarettes are commonly packaged in a packet enclosed in an outer wrapper, usually of transparent material. The machine for wrapping the packet in the wrapper is capable of operating at a speed greater than the packing machine that forms the packet. Thus, for example, a wrapping machine with twin wrapping tracks may conveniently be operated at twice the speed of a packing machine, so that two packing machines can be linked up with a single wrapping machine. If one of the packing machines temporarily goes out of action the wrapping machine can continue running at half speed on the output from the other packing machine. It is essential, however, that each of the two tracks of the wrapping machine should be supplied over a short period of time with the same number packets, whether both or either packing machine is running, so that there will be no interruption in the supply of packets on either track.

According to this invention there is provided a conveyor system for distributing the output of articles from two sources uniformly among two input tracks, comprising an indexable conveyor movable between rest periods in indexing steps greater than the width of the articles, means for feeding successive articles from said two sources onto said indexable conveyor so that adjacent articles on said conveyor are from alternate sources, first and second input tracks leading from the conveyor downstream of said two sources, said second track being spaced downstream of said first track by at least one indexing step, and first and second pusher means associated with said first and second tracks respectively for transferring articles from said conveyor to the respective tracks, wherein for every four indexing steps of the conveyor each pusher means is only actuated after each of two successive indexing strips so that articles are distributed uniformly among the two tracks.

Where the spacing between the input tracks is two or three indexing steps, the second pusher is respectively in phase with the first pusher means, or lagging the first pusher means by one indexing step.

Preferably each pusher means comprises a rotary member having two article engaging portions spaced 90° apart, the two rotary members having a common drive shaft.

The invention may also be applied to three or more sources of articles feeding an equal number of input tracks.

A conveyor system according to the invention will now be described, by way of example only, with reference to the accompanying drawings in which:

FIG. 1 is a plan view of the conveyor system,

FIG. 2 is an enlarged partial side view taken on the line II—II of FIG. 1,

FIGS. 3A and 3B are side views of two pusher rotors, and

FIG. 4 is a diagrammatic view of a complete cycle of operation.

Referring first to FIGS. 1 and 2, the output from two cigarette packing machines (not shown) is fed in a continuous stream of packets A2, A3 etc., and B1, B2, B3 etc., along respective conveyors A and B. Running transversely across the end of the conveyors A and B is a conveyor 10 formed with regularly spaced compartments or pockets 12 (FIG. 2). The conveyor 10 is driven by an indexing drive (not shown) so that it is moved in steps corresponding to the pitch length or spacing between adjacent pockets.

Downstream of the conveyor B a pair of parallel tracks 14, 16 extend transversely. The tracks 14, 16 constitute the twin tracks of a machine (not shown) for wrapping cigarette packets in a transparent outer wrapper. The spacing between the conveyors A and B, between the tracks 14 and 16, and between the conveyor B and track 14 each corresponds to the pitch length between the pockets 12, so that the track 16 is spaced three pitch lengths downstream of the conveyor A.

At the end of the conveyor A is a device (shown in FIG. 2) for transferring packets singly to a pocket 12 while the conveyor 10 is stationary. A similar device is disposed at the end of the conveyor B. The device comprises a vertically slidable plunger 18 mounted at the intersection of the conveyor A and the conveyor 10. A stop 20 at the end of the conveyor A on the opposite side of the conveyor 10 serves to position a packet A2 at the correct location over a pocket 12. As shown in FIG. 2 the plunger 18 is about to lower and transfer the packet A2 into the pocket 12 below. When the plunger 18 has been lowered, it prevents the next packet A3 being fed by the conveyor A towards the stop 20, until the plunger 18 is again lifted.

Referring now also to FIGS. 3A and 3B, there are shown two pusher rotors 24, 26 associated with the respective tracks 14, 16. The rotors are connected to a common drive shaft 28 (shown chain-dotted in FIG. 1) driven at constant speed. Spaced around the periphery of each rotor are two rounded protrusions 30 spaced 90° apart, the pair of protrusions on the rotor 24 lagging 90° behind those of the rotor 26. In the position of the rotor 24 shown in FIG. 3A, the rear protrusion 30 has engaged a packet A1 and is about to start pushing it into the track 14.

A complete cycle of operations of the conveyor system will be described with added reference to FIG. 4, which schematically illustrates five successive positions a to e of the packets on the conveyor 10. In the position a the foremost packets A2 and B1 from the conveyors A and B are deposited into adjacent pockets on the conveyor 10. At the same time a packet A1, having previously been received from the conveyor A, is transferred from the conveyor 10 by the pusher rotor 24 to the track 14 (as shown by arrow 22). The conveyor 10 is then indexed, bringing the packets A2, B1 one step or pitch to the right, as shown at b. During this stoppage period no packets are transferred to, or away from, the conveyor 10.

At the third position c, the next packets A3 and B2 are deposited from the conveyor A and B; and at the same time the packet B1, which has been brought into alignment with the track 16, is pushed out of the conveyor 10 into the track 16 by the pusher rotor 26 (arrow 23). The three packets A3, B2, A2 are next indexed one step to the right, and this time both the rotors 24, 26 operate to transfer the packets B2 and A2 onto the respective tracks 14 and 16 (arrows 22 and 23). At the fifth position e the rotors have each turned one full revolution and the situation is again similar to that at position a.

It will be seen from FIG. 4 that if one of the packing machines stops, so that there is an interruption of the stream of packets from, say conveyor A, the conveyor system continues to distribute the packets from conveyor B amongst the tracks 14, 16. In this case only the packets B1, B2, B3 etc., are passed onto the wrapping machine, which will therefore need to be slowed down to half its previous speed.

The conveyor system can likewise be arranged to cope with two packing machines operating at different outputs. For this purpose a packet sensor 34 (FIG. 1) is associated with each conveyor A and B at a position of about five packets from the end of the respective conveyor. Each sensor 34 is connected to control the operation of the respective transfer plunger 18. Thus conveyor 10 may be run at a speed corresponding to the faster operating packing machine, so that the stream of articles coming towards the conveyor 10 on, say, conveyor A, is gradually reduced. In this case when the sensor 34 detects a gap on the conveyor A, it prevents further packets (e.g. packet A3 etc.,) being passed to the conveyor 10. After a predetermined delay, if the sensor 34 detects that the gap has been filled, it allows the plunger 18 to resume its operation. In this way the input to the wrapping machine alternates between packets only from conveyor B, and an equal proportion of packets from conveyor A and B, the speed of the wrapping machine being appropriately reduced to the average rate of input to the tracks 14 and 16.

I claim:

1. A conveyor system for distributing the output of articles from two sources uniformly among two input tracks, comprising an indexable conveyor adapted to move between rest periods in indexing steps greater than the width of the articles, means for feeding successive articles from said two sources onto said indexable conveyor whereby said articles are merged into a single row wherein adjacent articles on said conveyor are from alternate sources, first and second input tracks leading from the conveyor downstream of said two sources, said second track being spaced downstream of said first track by at least one indexing step, first and second pusher means associated with said first and second tracks respectively for transferring articles from said conveyor to the respective track, said second pusher means being spaced downstream of said first pusher means by a distance equal to the distance between said input tracks, and means for controlling said first and second pusher means so that for every four indexing steps of said conveyor each pusher means is only actuated after each of two successive indexing steps and said first and second pusher means are actuated out of phase such that said second pusher means leads said first pusher means by one indexing step so that articles are distributed uniformly among the two input tracks.

2. A conveyor system as claimed in claim 1, wherein said control means comprises a pair of rotary members mounted on a common drive shaft, said pair of rotary members being associated with said first and second tracks respectively and being spaced from each other by a distance equal to the distance between said input tracks, said first and second pusher means each comprising a pair of article engaging elements mounted 90° apart on each of said rotary members, said pair of article engaging elements on the first rotary member lagging 90° behind said pair of article engaging elements on the second rotary member.

3. In a cigarette packaging installation comprising a wrapping machine having two spaced input tracks and a pair of packing machines for supplying cigarette packets required to be wrapped to said wrapping machine, the improvement comprising:

(a) an indexable conveyor movable past said input tracks in indexing steps corresponding to the spacing between said tracks, (b) means for feeding successive packets from said pair of packing machines on to said indexable conveyor whereby said articles are so merged that adjacent packets on said conveyor are from alternate packing machines, and (c) first and second pusher means associated respectively with said two input tracks for transferring packets from said conveyor to the respective tracks, said second pusher means being spaced downstream of said first pusher means by a distance equal to the distance between said input tracks, and (d) means for controlling said first and second pusher means so that for every four indexing steps of the conveyor each pusher means is only actuated after each of two successive indexing steps and said first and second pusher means are actuated out of phase such that said second pusher means leads said first pusher means by one indexing step so that said packets are distributed uniformly among said two input tracks.

4. A conveyor system as claimed in claim 1 wherein each of said sources comprises a transport means for feeding articles along a path to said indexable conveyor, each of said transport means comprising sensing means connected to said feeding means for sensing the absence of articles along said path of said respective transport means and for controlling the operation of said feeding means.

5. A cigarette packaging installation as claimed in claim 3 further comprising a pair of transport means, each for feeding packets along a path from respective of said packing machines to said indexable conveyor, each of said transport means comprising sensing means connected to said feeding means for sensing the absence of packets along the respective path and for controlling the operation of said feeding means.

* * * * *

UNITED STATES PATENT OFFICE
CERTIFICATE OF CORRECTION

Patent No. 4,262,792            Dated April 21, 1981

Inventor(s) Robert W. Davies

It is certified that error appears in the above-identified patent and that said Letters Patent are hereby corrected as shown below:

Cover page, column 1, between lines 5 and 6 insert the following:

Foreign Application Priority Data

May 9, 1978 United Kingdom...18374/78

*Signed and Sealed this*

*Twenty-first* Day of *July 1981*

[SEAL]

Attest:

GERALD J. MOSSINGHOFF

*Attesting Officer*      *Commissioner of Patents and Trademarks*